United States Patent
Merideth

(10) Patent No.: US 10,480,055 B2
(45) Date of Patent: Nov. 19, 2019

(54) SYSTEM FOR MANAGEMENT OF MECHANICAL STRESS IN NITINOL COMPONENTS

(71) Applicant: Marcus E. Merideth, Westland, MI (US)

(72) Inventor: Marcus E. Merideth, Westland, MI (US)

(*) Notice: Subject to any disclaimer, the term of this patent is extended or adjusted under 35 U.S.C. 154(b) by 359 days.

(21) Appl. No.: 15/479,452

(22) Filed: Apr. 5, 2017

(65) Prior Publication Data

US 2017/0298494 A1   Oct. 19, 2017

Related U.S. Application Data

(62) Division of application No. 14/602,731, filed on Jan. 22, 2015, now Pat. No. 9,714,460.

(60) Provisional application No. 61/939,436, filed on Feb. 13, 2014.

(51) Int. Cl.
  *C22F 1/10* (2006.01)
  *C22F 1/00* (2006.01)
  *H05B 3/02* (2006.01)
  *F03G 7/06* (2006.01)

(52) U.S. Cl.
  CPC .............. *C22F 1/10* (2013.01); *C22F 1/006* (2013.01); *F03G 7/065* (2013.01); *H05B 3/023* (2013.01)

(58) Field of Classification Search
  None
  See application file for complete search history.

(56) References Cited

U.S. PATENT DOCUMENTS

| 6,124,662 | A | 9/2000 | Maness |
| 6,762,515 | B2 * | 7/2004 | Gummin ............. F03G 7/065 |
| | | | 310/12.01 |
| 7,464,548 | B2 | 12/2008 | Yson et al. |
| 7,980,074 | B2 | 7/2011 | Gao et al. |
| 2003/0106761 | A1 | 6/2003 | Taylor |
| 2004/0123610 | A1 * | 7/2004 | Nowak ............... F24F 13/12 |
| | | | 62/187 |
| 2005/0252260 | A1 * | 11/2005 | Chu ................. E05B 47/0009 |
| | | | 70/278.7 |

(Continued)

*Primary Examiner* — George Wyszomierski
(74) *Attorney, Agent, or Firm* — C. John Brannon; Brannon Sowers & Cracraft PC

(57) ABSTRACT

A self-limiting shaped memory alloy device, including a shape memory alloy member, with first and second ends, a first anchor member connected to the first end, an energy contact, a second anchor member connected to the energy contact, an energy source connected in energetic communication to the energy contact, a moveable member connected to the second end, and a biasing member operationally connected to the moveable member for urging the moveable member towards and into physical contact with the second anchor member. The moveable member is in physical contact with the second anchor member and the second end is in energetic communication with the energy contact. Actuation of the energy source energizes the energy contact. Energization of the shape memory alloy member initiates a phase change that urges the moveable member away from the second anchor member. Movement of the moveable member away from the second anchor member disengages the second end from the energy contact.

4 Claims, 3 Drawing Sheets

(56) References Cited

U.S. PATENT DOCUMENTS

| | | | |
|---|---|---|---|
| 2008/0128524 A1* | 6/2008 | Minor | F03G 7/065 236/103 |
| 2009/0013684 A1* | 1/2009 | Takahashi | F03G 7/065 60/527 |
| 2013/0011806 A1* | 1/2013 | Gao | F03G 7/065 432/37 |
| 2013/0087334 A1 | 4/2013 | Buytaert | |
| 2013/0205768 A1 | 8/2013 | Kim | |
| 2013/0214141 A1 | 8/2013 | Hogo | |

\* cited by examiner

SYSTEM FOR MANAGEMENT OF MECHANICAL STRESS IN NITINOL COMPONENTS

CROSS-REFERENCE TO RELATED APPLICATION

The present patent application is a divisional of, and claims priority to, U.S. patent application Ser. No. 14/602,731, filed on Jan. 22, 2015, now U.S. Pat. No. 9,714,460, which claimed priority to then co-pending U.S. provisional patent application Ser. No. 61/939,436, file on Feb. 13, 2014, the entirety of which is incorporated herein by reference.

TECHNICAL FIELD

This novel technology relates generally to the field of materials science and, more particularly, to a system for controlling and limiting the applied energy and resultant stress in a cyclical-memory or shape-memory material component, such as a Nitinol material component, to moderate and reduce cyclic fatigue.

BACKGROUND

Shape-memory alloys (SMAs) are materials that, once deformed, return to their original shape upon heating. SMAs are typically either of the copper-aluminum-nickel system or nickel-titanium system of alloys, although other alloys may also exhibit SMA properties. Although not the cheapest SMAS, nickel-titanium alloys, such as Nitinol, are popular due to their stability and superior cycling properties.

SMAs function by shifting back and forth between can two different phases, with three different crystal structures (i.e. twinned martensite, detwinned martensite and austenite) and six possible transformations. Nitinol, for example, changes from austenite to martensite when cooled, with a specific transition temperature to martensite upon cooling and specific temperatures upon which the transition to austenite begins and finishes upon heating. Repeated cycling of SMAS eventually leads material fatigue, as evidenced by a creep or drift in the specific transition temperatures. Further, if heated beyond a maximum threshold temperature, SMAS lose their ability to be cycled between shapes and thus are susceptible to permanent deformation. The phase transition from the martensite to austenite is thus a function of temperature and induced stress, but not a function of time.

SMAs may remember only a 'cold' shape, to which a deformed SMA returns upon heating and then cooling, or they may remember both a 'hot' shape and a 'cold' shape, between which they may be thermally cycled. In either case, accumulated cycling will eventually result in fatigue. SMAs do not have infinite cycling capacity and thus potentially long service lifetimes limited by the number of cycles experienced and the degree of stress experienced during each cycling event.

Currently, stress in SMAs is managed with electronic sensors or switches. Nitinol, for example, transforms its crystal structure between martensitic and austenite, with the transformation based on the energy state of the material. Temperature is a common way to measure the energy state of the material. Many devices limit the energy of their SMA components by monitoring the temperature of the SMA element and regulating energy input based on the measured temperature. Alternately, some systems regulate energy input based on percent deformation of the SMA element, such as by using complex algorithms based on experimental data. Both of these methods require some sort of intelligence to manage. Excess energy in the SMA element will degrade the reversible transformation life cycle. As both of the above-described methods measure temperature and/or deformation as a basis for regulation, they both suffer from the drawback that excessive temperature and/or deformation must be measured before regulation is initiated, but if temperature increases or excessive deformations occur rapidly, the SMA element incurs life-cycle shortening damage before regulation is effectively implemented. Thus, there remains a need for a system of regulating SMA element cycling that prevents excessive heat and/or deformation from occurring. The present novel technology addresses this need.

DESCRIPTION OF PREFERRED EMBODIMENTS

Figure 1:
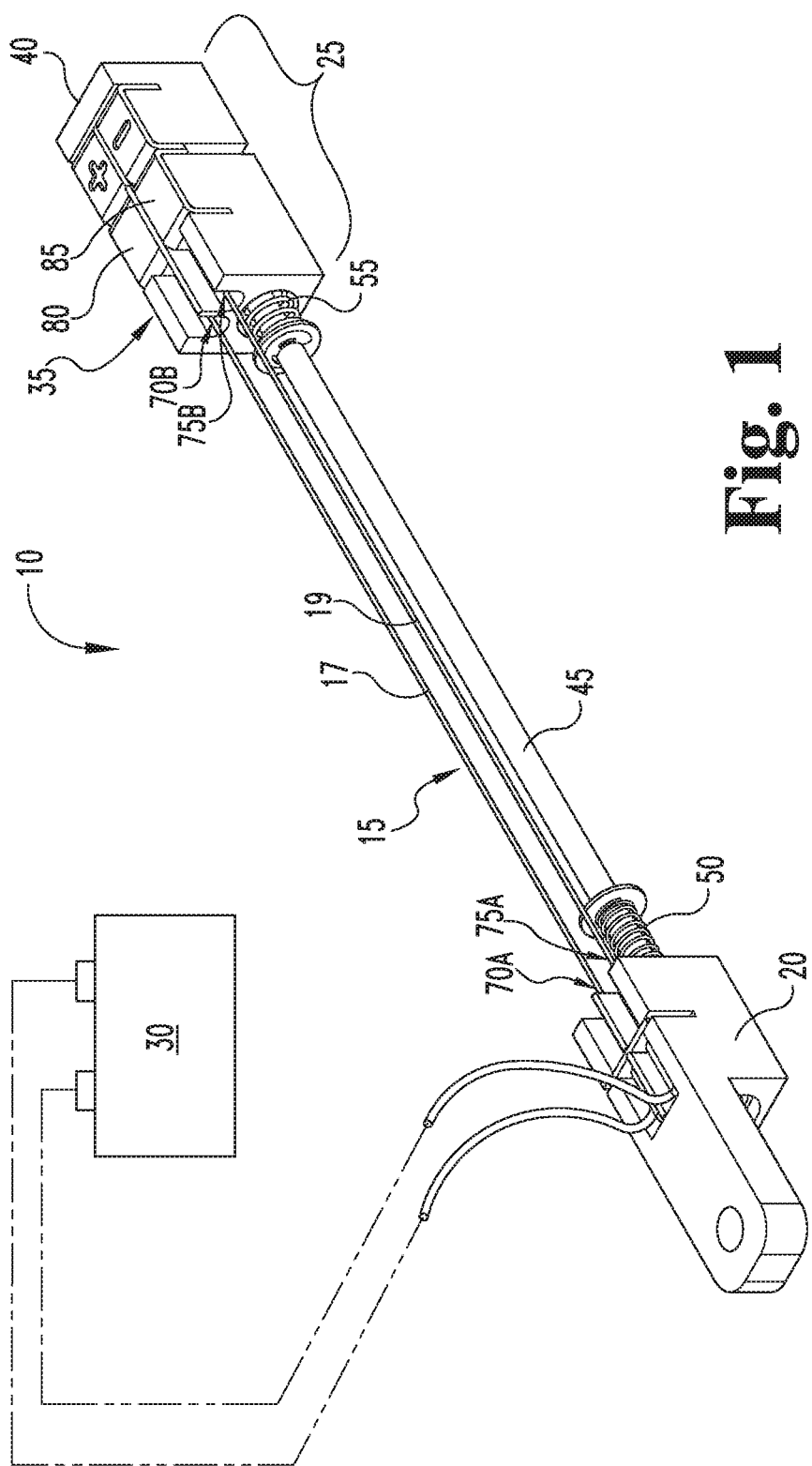
FIG. 1 is a first perspective view of a first embodiment mechanical stress management system of the present novel technology.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Figure 2:
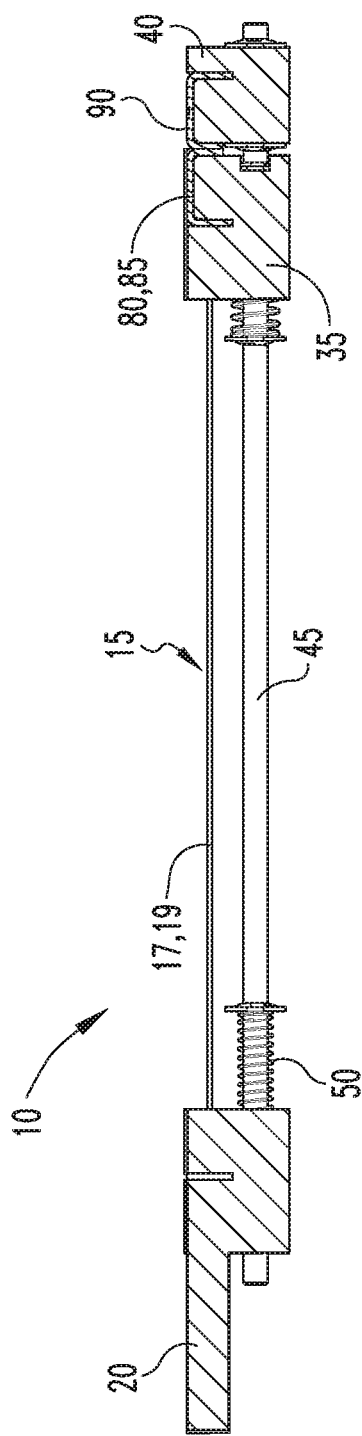
FIG. 2 is a side elevation view of FIG. 1.
Figure 3:
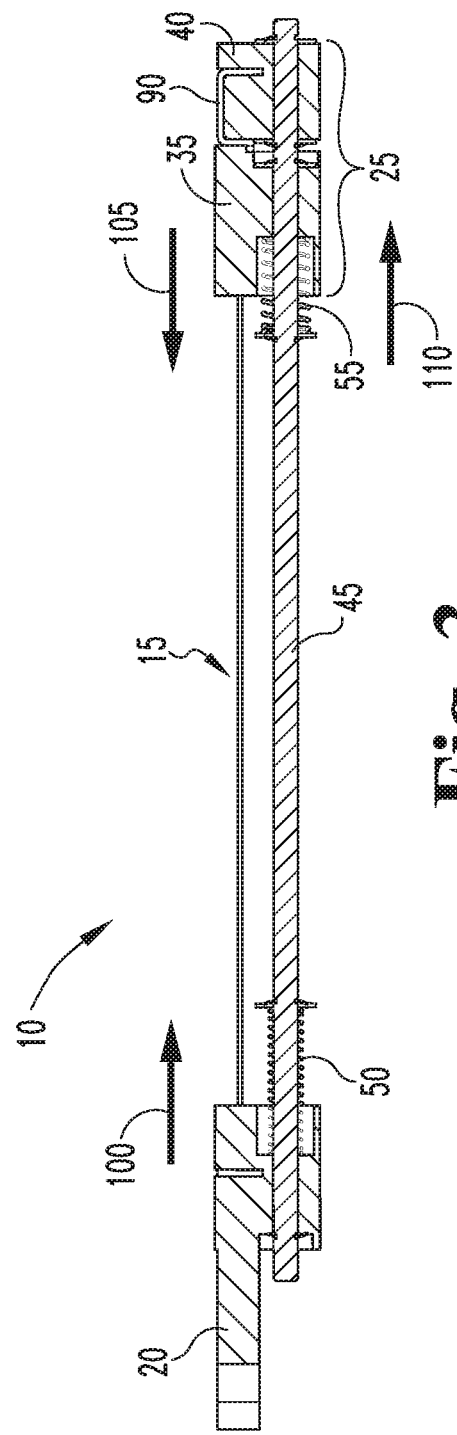
FIG. 3 is a cutaway view of FIG. 2.
Figure 4:
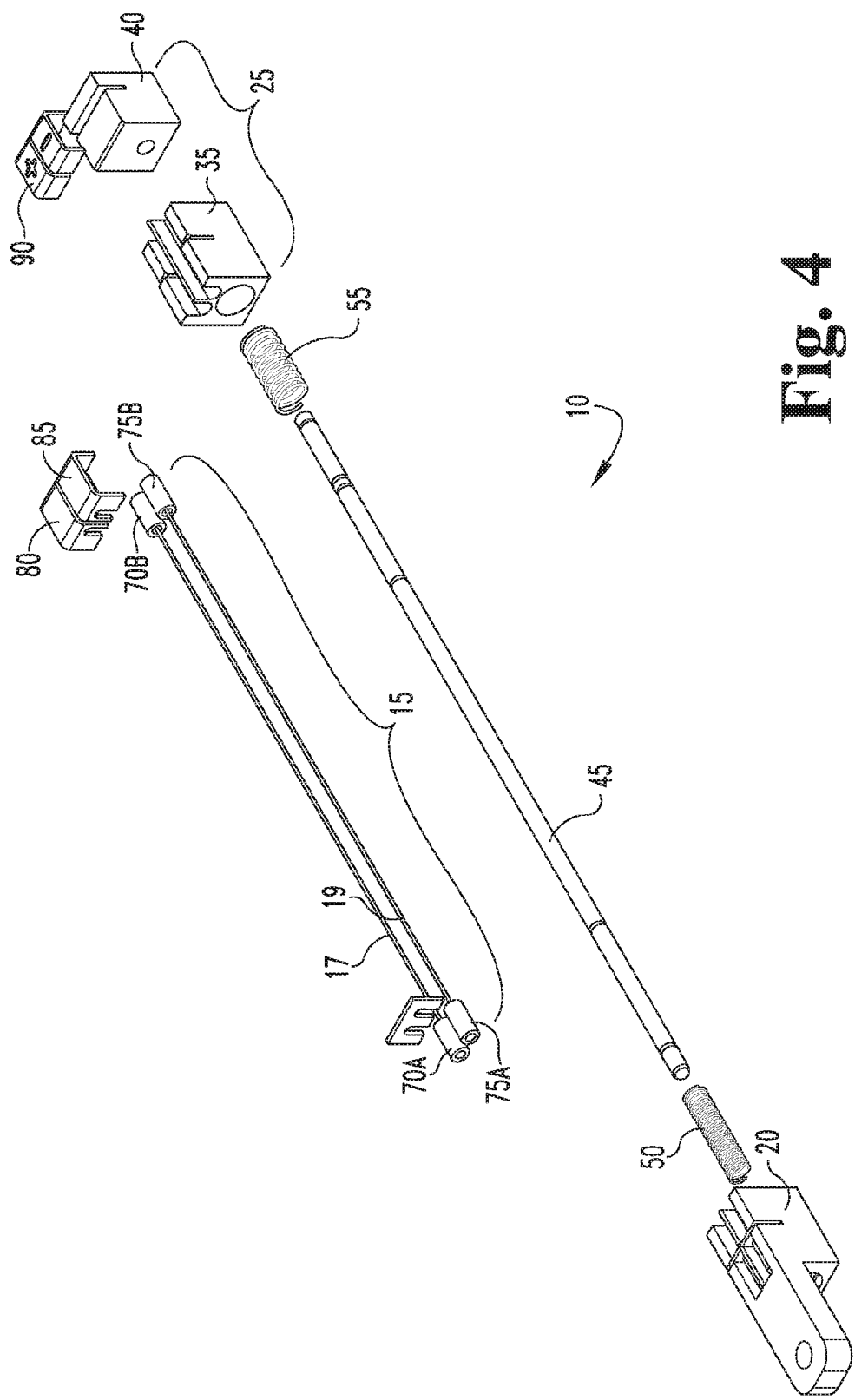
FIG. 4 is an exploded view of FIG. 1.

According to a first embodiment of the present novel technology, as illustrated in FIGS. 1-4, the present novel technology relates to a system 10 for managing the energy and/or stress of a shape-metal alloy element to reduce or minimize the accumulation of fatigue, thus extending the life of the SMA element. One such embodiment system 10 includes an SMA element 15 (in this case, a double length of Nitinol wire including first parallel wire 17 and second parallel wire 19, although any SMA element form and composition may be elected) mechanically connected between a structural support base member or block 20 and a second, typically partitioned, support member or block 25, and also connected in energetic communication with an energy source 3 o. In this embodiment, the energy source 30 is an electric power supply connected in electric communication with the SMA element 15; however, in other embodiments the energy source may be a heat source, a light source, or the like.

The partitioned block 25 further includes a proximal portion 35 and a distal 4 0 portion normally abutting one another in direct physical contact, with an elongated member 45 extending through both portions 35, 40 and clamped or otherwise mechanically affixed to both portions 35, 40. The elongated member 45 is likewise operationally connected to a return spring 50 at one end and a biasing member or overstress spring 55 at the other. The return spring 50 is mechanically engaged with the base block 20, and the overstress spring 55 is likewise mechanically engaged with the proximal portion 35.

Optionally, an energy management device 60 is operationally connected between the energy source 30 (in this embodiment, a DC power supply) and the SMA element 15 to control the electrical power into the SMA wire element 15 (which in the prior art is based on wire temperature or percent contraction of the wire). The return spring 50 provides an urging force through the elongated member 45 and the blocks 20, 25 onto the SMA element 15 to extend the SMA wires 15 when there is no power flowing, such as after power has been removed.

Wire 17 includes a first electrical contact 70A at one end and a second electrical contact 70B at the opposite end. Likewise, wire 19 includes a first energy conducting (typically electrical) contact 75A at one end and a second energy conducting or electrical contact 75B at the opposite end. An energy conducting contact 80, typically an electrode, electric power clip, thermal conductor, or the like, is mechanically connected to proximal portion 35 and is engaged in electric communication with contact 70B. Energy conducting contact 85 is physically spaced from electric contact 80, is mechanically connected to proximal portion 35 and is engaged in electric communication with contact 75 B. Energy conducting contact 90 is mechanically engaged to distal portion 40 and when distal portion 40 abuts proximal portion 35, contact 90 is in mechanical and electrical connection with contacts 80 and 85.

The present novel technology further includes a biasing member such as an over stress spring or tension device 55 operationally connected to the SMA wire element 15, in this embodiment through the elongated member 45 and the blocks 20, 25, and engaged to the proximal portion 35 to limit the maximum stress experienced by the wire 15. The over stress spring 55 provides a constant, predetermined urging force 105 on the proximal portion 35 in the direction of the distal portion 40. The urging force 105 keeps the proximal and distal portions 35, 40 in contact while the SMA wire 15 contracts due to the phase change induced by the heating of the wire 15 when the power source 30 is engaged. When the contraction of the SMA wire element 15 generates a sufficiently great urging force 110 opposite that of the over stress spring 55, the proximal and distal portions 35, 40 physically move apart and separate from one another 35, 40, thus breaking the electrical connection between contact 90 and contacts 80, 85, thus ceasing the flow of energy into the wire element 15. As the wire 15 cools and extends, the urging force 110 pulling the blocks 20, 25 together diminishes and the urging force 105 from the overstress spring 55 once again dominates, pushing the proximal portion 35 away from the base block 20 and towards the distal portion 40 until the contacts 90 and 80, 85 once again touch in electric communication. The returning electrical connection enables energy to flow into the wire 15, repeating the cycle until power is once again automatically removed. The over stress spring 55 is typically sized to limit the stress in the wire element 15 to a predetermined maximum stress. The maximum stress in the wire 15 influences the fatigue cycle life of the wire 15, with lower maximum allowed stress producing a higher fatigue limit. The return spring 50 is used to extend the wire 15 after the power is removed. The value of the urging force 100 or the spring constant of the return spring 50 may also be manipulated to contribute to the maximum transition energy level allowed in the wire 15.

In general, the system 10 may be described as a failsafe for automatically preventing an SMA element 15 from experiencing excessive, degenerating stress and the subsequent damage or fatigue caused by the same. The urging force no generated by the physical dimensional transition accompanying the phase transition of the anchored SMA element 15 is harnessed to overcome an opposing urging force 105 (as provided by the biasing element 55) to disengage the energy source 30 driving the SMA phase transition. The energy source 30 is connected to the SMA element 15 at the junction of two members 35, 40, which are urged apart by the dimensional transition of the SMA element against the urging force 105 of the biasing element 55. The shape memory alloy member 15 may expand or contract upon energization and phase transition. The urging force 105 of the biasing element 55 is calibrated to be countered by the urging force 110 generated by the dimensional change of the SMA element 15 before the stress in the SMA element 15 accompanying the phase transition exceeds some predetermined maximum. The predetermined maximum stress value is typically selected to be lower than a threshold value associated with rapid fatigue of the SMA element 15 so as to prolong the service life of the SMA element 15.

In operation, the system 10 operates to automatically limit the stress level of a shape memory alloy member 15 to prevent service life foreshortening levels of stress by first connecting the shape metal alloy member 15 to a first base structural member 20 and to a second moveable structural member 35, and also connecting an energy input source 30 to an energy conducting member 90. The energy conducting member 90 is connected to a third structural member 40. The second and third structural members 35, 40 may be separate or connected as a single unit 25. The third structural member 40 is positioned in contact with the second structural member 35, and the shape metal alloy member 15 is connected in energetic communication with the energy conducting member 90. A biasing member 55 is connected to the second structural member 35 to provide a first urging force 105 thereupon, wherein the first urging force 105 urges the second structural member 35 towards the third structural member 40. The energy conducting member 90 is energized to conduct energy into the shape memory alloy member 15, generating an opposite, greater urging force 110 in the shape memory alloy member 15 urging the second structural member 35 to move away from the third structural member 40. The energy conducting member 90 is disengaged from the shape memory alloy member 15, and no longer conducts energy thereinto.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A method of automatically limiting the stress level of a shape memory alloy member to prevent service life foreshortening levels of stress, comprising:

a) connecting the shape memory alloy member to a first base structural member and to a second moveable structural member;

b) connecting an energy input source to an energy conducting member;
c) connecting the energy conducting member to a third structural member;
d) positioning the third structural member in contact with the second structural member;
e) connecting the shape memory alloy in energetic communication with the energy conducting member;
f) connecting a biasing member to the second structural member to provide a first urging force thereupon, wherein the first urging force urges the second structural member towards the third structural member;
g) energizing the energy conducting member to conduct energy into the shape memory alloy member;
h) generating an opposite, greater second urging force in the shape memory alloy member urging the second structural member to move away from the third structural member; and
i) disengaging the energy conducting member to conduct energy from the shape memory alloy member.

2. The method of claim 1 wherein the second structural member is positioned between the first and third structural members.

3. The method of claim 1 wherein the shape memory alloy member contracts when energized.

4. The method of claim 1 wherein the shape memory alloy member expands when energized.

\* \* \* \* \*